United States Patent
Gavino (10) Patent No.: US 7,114,967 B2
(45) Date of Patent: Oct. 3, 2006

(54) BUILT-IN ELECTRIC CONTACT ENCLOSURE AND MOUNTING METHOD

(75) Inventor: Denis Gavino, Saint Ouen l'Aumone (FR)

(73) Assignee: SIBECX, (FR)

( * ) Notice: Subject to any disclaimer, the term of this patent is extended or adjusted under 35 U.S.C. 154(b) by 0 days.

(21) Appl. No.: 10/499,113

(22) PCT Filed: Dec. 19, 2002

(86) PCT No.: PCT/FR02/04470

§ 371 (c)(1),
(2), (4) Date: Oct. 13, 2004

(87) PCT Pub. No.: WO03/055012

PCT Pub. Date: Jul. 3, 2003

(65) Prior Publication Data

US 2005/0037646 A1    Feb. 17, 2005

(30) Foreign Application Priority Data

Dec. 21, 2001 (FR) .................................. 01 16792

(51) Int. Cl.
*H01R 13/44* (2006.01)

(52) U.S. Cl. .................................................. 439/131

(58) Field of Classification Search ........ 439/550–551, 439/338–339, 131, 132, 158, 197, 722; 361/366, 361/156, 146, 364, 368; 174/59
See application file for complete search history.

(56) References Cited

U.S. PATENT DOCUMENTS

| 3,922,478 | A | | 11/1975 | Perkey |
| 4,425,016 | A | * | 1/1984 | Denckert ..................... 439/304 |
| 4,669,791 | A | * | 6/1987 | Savill .......................... 439/34 |
| 4,977,482 | A | * | 12/1990 | Langdon et al. ............ 361/661 |
| 6,066,817 | A | * | 5/2000 | Flegel ........................ 200/296 |
| 6,261,109 | B1 | | 7/2001 | Liu |
| 2002/0127898 | A1 | * | 9/2002 | Liu ............................ 439/131 |

FOREIGN PATENT DOCUMENTS

| DE | 7405760 | 5/1974 |
| DE | 7502705 | 8/1975 |
| DE | 10023235 | 11/2001 |
| EP | 0933838 | 8/1999 |

* cited by examiner

*Primary Examiner*—Truc T. Nguyen
*Assistant Examiner*—Edwin A. Leon
(74) *Attorney, Agent, or Firm*—Boyle, Fredrickson, Newholm, Stein & Gratz, S.C.

(57) ABSTRACT

The mounting of an electric enclosure (1) for electric connector and switch embeddable in a piece of masonry work requires the connecting of electric wires (25) to an electrically conductive region or terminal inside the enclosure. The connection requires screwing in the enclosure wires by means of an intermediate part. To facilitate the mounting of these electric enclosures for electrical connectors and switches, the invention provides for the mounting of these enclosures by embedding by simple sliding of a sleeve (3) inside a housing (2) in such a way that the female terminals directly linked to the electric wires of the enclosure are in contact with the male terminals of the sleeve. The electric enclosure is dismantled by simply pulling from the sleeve towards the outside of the enclosure.

29 Claims, 3 Drawing Sheets

BUILT-IN ELECTRIC CONTACT ENCLOSURE AND MOUNTING METHOD

FIELD OF THE INVENTION

The invention relates to an embeddable electric contact enclosure and its associated mounting method. It is an aim of the invention to facilitate the mounting and dismounting of such embeddable electric enclosures in a wall without the use of tools such as a screw-driver or screws during the phases for mounting and dismounting these enclosures. A wall may be one within which a hole is made in order to embed the electric enclosure of the invention therein. The invention is designed more particularly for the field of electricity but can also be applied to other fields. In the field of electricity, this electric enclosure can be used especially to connect an electric connector to a current generator source or this electric enclosure can be used to make a switch designed to set up an electric connection at request.

BACKGROUND OF THE INVENTION

An electric enclosure has a housing and an electric device, provided especially with a cover. The housing is designed to be inserted into a wall. A wall may be vertical or horizontal. It may be constituted every material used in the building industry (such as concrete, building blocks, stone and other rigid complex materials forming partition walls, formed especially by plaster partition slabs with cardboard ties). The housing is drilled with holes within which electric wires coming from the wall can be inserted. The electric device has a first side and a second side. The first side is placed facing the housing. It is intended that the electric wires will get connected to this first side. In a first example, it is intended that three electric wires will get connected to this first side. The second side is placed outside the housing. In the case of a housing designed to receive an electric connector, this second side of the electric device and hence of the cover may comprise two conductive holes used to receive two plugs of an electric connector. These two holes are directly connected to the electric wires. The contact of the two plugs with a wall of the two holes of the electric device directly connected with the electric wires is enough to set up the electric connection. Or else the second side may comprise a handle if it is a switch. In this case, the electric connection is set up by pressing on the handle so as to connect the electric wires.

In the case of an electric enclosure, designed to receive plugs of an electric connector, the holes of the electrical device correspond to female terminals and the plugs of an electric connector are male terminals that must fit into the female terminals. Such electric enclosures usually have two female terminals. The third male terminal is designed to serve as a ground connector.

In the case of the mounting of an enclosure designed to receive an electric connector, three electric wires coming from the wall are first of all placed inside the enclosure in passing through holes of the housing. Then the wires are fixed to the three female or male terminals of the electric device. To fix the three wires to the electric device of the switch and/or of the electric connector, it is necessary to grip the wires in the electric device by means of an intermediate part. For example, the intermediate part may be a screw connector, comprising especially a metal plate. The metal plate is electrically conductive. The screw is itself connected to a female or male terminal. To get the wire gripped in the electric device, the screw is screwed in.

In the case of the mounting of such an electric enclosure, electric bridges can be made in connecting another wire from the screw so as to form an electric series connection.

However, the connection of the electric wires to the electric device as well as the connection of another electric wire necessitate the use of small intermediate parts that are difficult to handle and liable to escape from their housing during mounting. Their handling as well as the use of the screwdriver makes the mounting of such electric enclosures a delicate and difficult task.

Furthermore, an electric enclosure thus made is not compatible with any type of electric connector. For example, an electric enclosure designed to receive an European type of electric connector cannot be used for the insertion of an American rectangular electric connector. To accept an American connector of this kind, it is necessary to use a bulky adapter or change the enclosure completely.

SUMMARY OF THE INVENTION

To resolve these problems of the mounting of such electric enclosures, the invention provides for a hollowed-out housing of a cylindrical compartment. This cylindrical compartment is designed to receive a contact sleeve that gets fixedly embedded by sliding within the compartment of the housing. This sleeve corresponds to the electric device of the electric enclosure described here above. However, in being embedded inside the compartment of the housing, the sleeve according to the invention makes an electric connection. The electric connection is formed by the contact of three plates connected to the three electric wires positioned at an internal periphery of a central space of the compartment with three electrically conductive strips positioned on the sleeve. Within these connection spaces, the insertion of the electric wires does not necessitate the use of tools such as screw-drivers. The electric wires are inserted by hand within the connection space through one face of a housing, from the wall up to the housing. The electric wire coming from the wall is inserted in such a way that it is in direct contact with one of the electrically conductive plates. Each plate could then be in direct contact with electrically conductive strips positioned on the sleeve.

In the invention, there is no longer any need to screw the wires by means of this intermediate part. It is only necessary to fixedly embed a sleeve within a housing by sliding. The embedding is enough to set up electric contact by the joining of the plates with the corresponding strips.

To make the use of such an electric enclosure compatible with any type of electric connector whatsoever, it is enough to embed a sleeve into a housing by sliding and by elastic fitting, this sleeve being made with holes designed to receive plugs of a given electric connector.

An object of the invention therefore is an electric contact enclosure comprising:
 a housing provided with a hollow compartment, the housing being embeddable in a hole in a wall, and
 a contact sleeve designed to receive plugs of a detachable electric connector, characterized by the fact that the contact sleeve is cylindrical and is embedded by sliding inside the compartment of the housing, the compartment too being correspondingly cylindrical.

An object of the invention is also an electric contact housing comprising:
 a housing provided with a hollow compartment, the housing being embeddable in a hole of a wall, and
 a contact sleeve designed to form a switch, characterized by the fact that the contact sleeve is cylindrical and is embedded by sliding inside the compartment of the housing, the compartment too being correspondingly cylindrical.

To facilitate the mounting of such an electric enclosure, the invention also comprises a method for the mounting of an electric enclosure, characterized by the fact that it comprises the following steps:

a housing is inserted into a wall, three electric wires coming from the wall are made to slide into three connection spaces of a compartment of the housing by holes coming from a rear face of the housing, a sleeve is fixedly embedded by sliding and then by being elastically fitted into the interior of the housing, and an electric connection is made during this embedding, and a covering plate is fixed on to the housing

DESCRIPTION OF THE DRAWINGS

The invention will be understood more clearly from the following description and the accompanying figures. These figures are given purely by way of indication and in no way restrict the scope of the invention. Of the figures.

DETAILED DESCRIPTION OF AT LEAST ONE PREFERRED EMBODIMENT

Figures 1, 2:
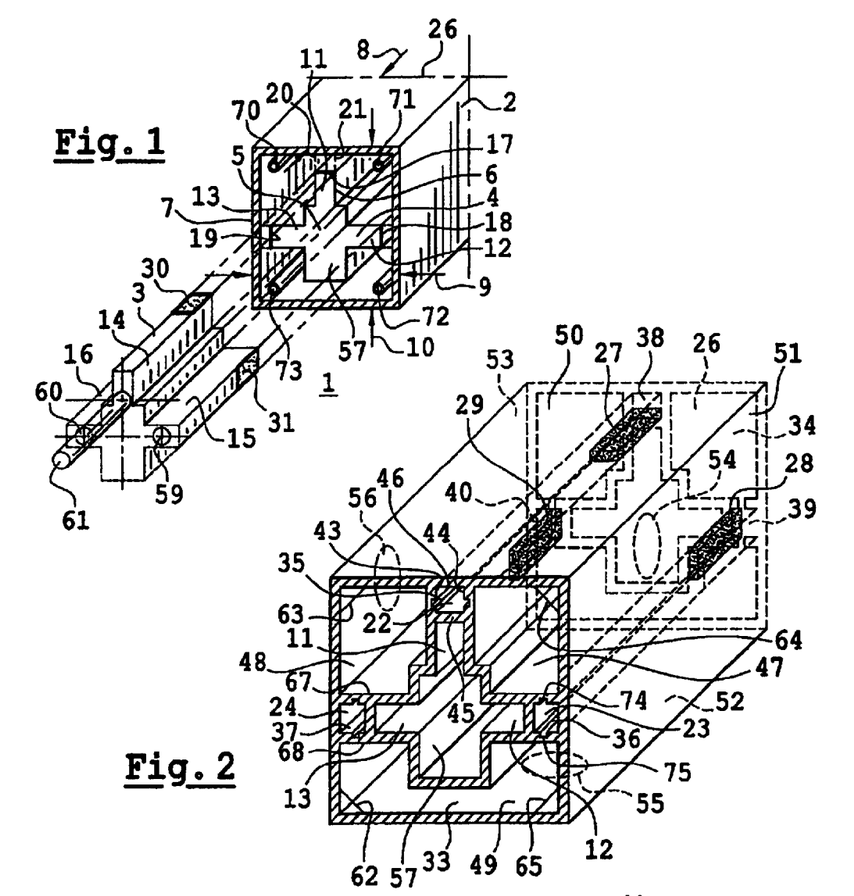
FIG. 1 shows an embeddable contact electric enclosure according to the invention.
FIG. 2 is a view in perspective of a housing of the electric enclosure according to the invention.

An embeddable contact electric enclosure 1 comprises a housing 2 designed to receive a contact sleeve 3 that gets embedded inside the housing according to the invention, FIG. 1. In the device of the invention, the term "enclosure" refers to the unit formed by a housing 2 and the sleeve 3. The housing 2 is designed to be definitively sealed into the wall, for example in being run in with plaster. This sleeve 3 comprises electric connection devices. These devices enable the electric connection of the ends of electric wires coming out of the wall at the position of the hole where the housing is located to terminals of plugs of a detachable electric connector, said plugs being temporarily made to penetrate the sleeve.

The housing advantageously has a square shape chipped off at the corners, but could also have a circular cylindrical shape. The square shape enables the accurate embedding of the housing 2 is in a reserved position made by hand by means of a chisel or hammer in a hard material. The square shape also makes it fairly easy to withdraw the housing 4 already embedded in plaster, for example by breaking the plaster with a hammer or screwdriver in order, as the case may be, to reposition the housing at another place. The same method is used for the sliding therein of a round housing made of the same materials.

The housing 2 is provided with a hollow cylindrical compartment 4, FIG. 1. According to the invention, the cylindrical compartment 4 is centered within the housing and is preferably T-shaped. The cylindrical compartment forms a central volume or central space 5. The housing also has an internal periphery 6 demarcated by the central space. An external periphery 7 is demarcated by the housing itself. The housing comprises a depth 8, a width 9 and a height 10.

According to the invention, the sleeve 3 gets fixedly embedded within the housing by sliding within the cylindrical compartment 4. To fixedly embed the sleeve by sliding within the cylindrical compartment, the cylindrical compartment 4 has three cylindrical cavities 11, 12 and 13 along its internal periphery 6, FIG. 1. The sleeve 3 correspondingly has three cylindrical protruding features 14, 15 and 16. The cylindrical cavities of the cylindrical compartment 4 are hollowed out on at least one part of the depth 8 of the housing. In the preferred example, the cylindrical compartment 4 is hollowed out throughout the depth 8 of the housing, FIGS. 1 and 2.

Each cylindrical cavity 11, 12 and 13 of the cylindrical compartment 4 is provided with a partition 17, 18 and 19, FIG. 1. According to the invention, the housing 2 has two tie-bars 20 and 21 connecting each of the partition walls 17, 18 and 19 to the external periphery 7 of the housing. These tie-bars 20 and 21 demarcate a connection space 22, 23 and 24 between each of the partition walls 17, 18 and 19 and the external periphery 7 of the housing, FIG. 2. Within each of these connection spaces 22, 23 and 24, there is inserted at least one electric wire 25, FIG. 4.

Each of the partition walls 17, 18 and 19 has an electrically conductive plate 27, 28 and 29 respectively, said plates being located at a place close to a bottom 26 of the housing, FIG. 2. Each of the partition walls 17, 18 and 19 forms a female terminal by means of the plates, FIG. 1. The sleeve 3 also has, correspondingly, three contact strips 30, 31 and 32 designed to come into contact with the plates 27, 28 and 29. These strips form male terminals. These plates 27, 28 and 29 can be affixed by being pushed in through a front face 33 of the housing into the connection spaces 22, 23 and 24 respectively so that they are placed at a position close to a rear face 34 of the housing between the bottom 26 and the partition walls 17, 18 and 19.

However, the connection spaces 22, 23, 24 may have relatively small dimensions to enable handling operations in order to insert the electrically conductive plates 27, 28 and 29. In one variant, to facilitate the positioning of the electrically conductive plates in the housing, it may be planned first of all to fabricate the cylindrical compartment 4, and then place an electrically conductive plate or electric connector on each of the partitions 17, 18 and 19 at a place designed to be dose to a rear face 34 of the housing and then affix the cylindrical compartment provided with these connectors to the bottom 26 of the housing.

Figure 3A:
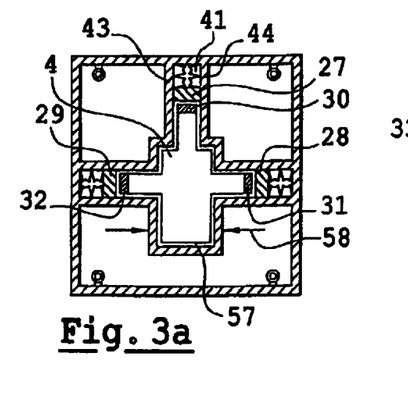
FIG. 3a is a cross-section view, seen in the direction of insertion of the sleeve, of an electric enclosure according to the invention.
Figure 3B:
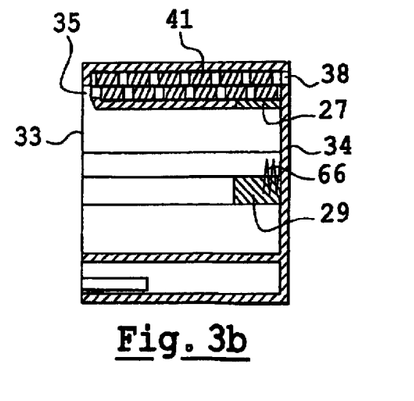
FIG. 3b is a longitudinal section of a housing of electric enclosure according to the invention.

The housing has a front face 33 whose plane is perpendicular to the direction of insertion of the sleeve 3 inside the housing, FIGS. 2 and 3b. The housing has a rear face 34 whose plane is parallel to the plane of the front face 33. The rear face 34 is designed to be in contact with the wall and the front face 33 is destined to be at a distance from the wall.

According to the invention, within the connection spaces 22, 23 and 24 the housing has holes 35, 36 and 37 on the front face 33 and holes 38, 39 and 40 on the rear face 34 of the housing. These holes are made in such a way that they have a size accepting the passage of only one electric wire 25 or several electric wires 25. These holes are preferably made in such a way that electric wires inserted through these holes can overlap one another in being parallel to one another inside these connection spaces 22, 23 and 24.

Figure 4:
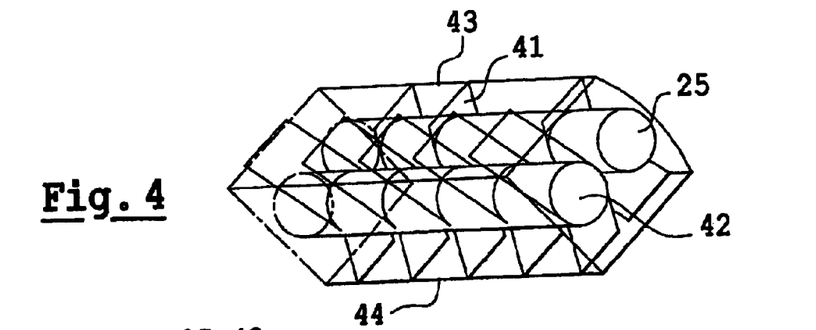
FIG. 4 is a diagrammatic representation of an insertion of electric wires into a housing.
Figure 5A:
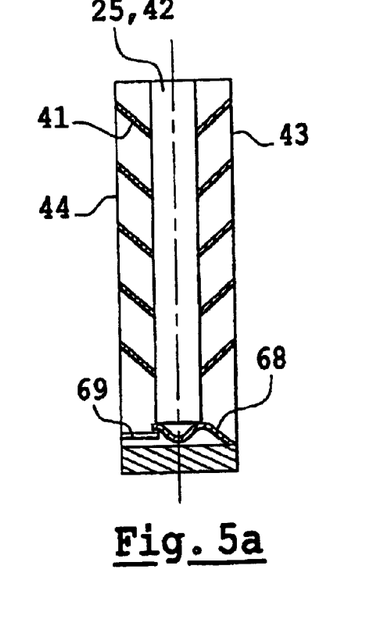
FIGS. 5a and 5b are diagrammatic representations of an installation of electric wires inside a housing.
Figure 5B:
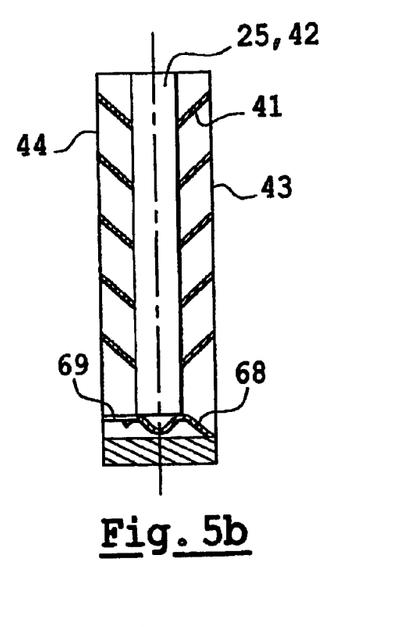

The electric wire 25 is coated with a protective sheath (not shown). To be in contact with the plates 27, 28 and 29, the electric wire is at least partially bared. To this end, fins 41, FIGS. 3a, 3b, 4 and 5, are presented inside connection spaces 22, 23 and 24. FIG. 4 shows two electric wires 25 and 42 bared by fins 41. Each connection space has four internal faces 43, 44, 45 and 46, FIG. 2. Each of these four faces 43, 44, 45 and 46 is placed respectively on the tie-bar 20, on the tie-bars 21, on one of the partition walls 17, 18 or 19, and on the external periphery 7 of the housing. Two of these four internal faces are provided with fins. The fins 41 have cutting edges and are inserted on two opposite internal faces. For example, the two internal faces may be the faces 43 and 44 located on the tie-bars 20, 21 inside the connection spaces 22, 23 and 24, FIGS. 2, 5a and 5b.

The fins 41 are tiltable. They are made in such a way that they are liable to slice the protection sheath surrounding the electric wire being contact with the electric wire.

They get tilted in the direction of insertion of the electric wire about an axis perpendicular to the direction of insertion of the electric wire. The fins can be tilted in such a way that they are inclined with respect to the faces 43 and 44, FIG. 4. Thus, after the connection wire has been inserted inside the connection space 22, 23 or 24, it will be enough to pull perpendicularly and in the direction opposite to the direction of insertion of the electric wire for the fins 41 to pull away a part of the protective sheath of this same electric wire. The at least partially bared electric wire may then be in direct contact with the plate 27, 28 and 29.

If, during the mounting of such an electric enclosure according to the invention, an electric wire is placed in a connection space that is not appropriate, then the electric wire can be withdrawn from this connection space without being sliced by the fins. To do this, since the fins are tiltable, it may be planned to have a device (not shown) connecting the fins. This device has a hook (not shown) made in such a way that, by the shifting of this hook, the fins get folded down in the direction of insertion of the electric wire towards the fin insertion face.

In one variant, the fins may also be electrically conductive and may be connected to the plates 27, 28 and 29 in such a way that, when the fins slice the protective sheath of the electric wire, they enable indirect contact between the electric wire and the plates.

Figure 7:
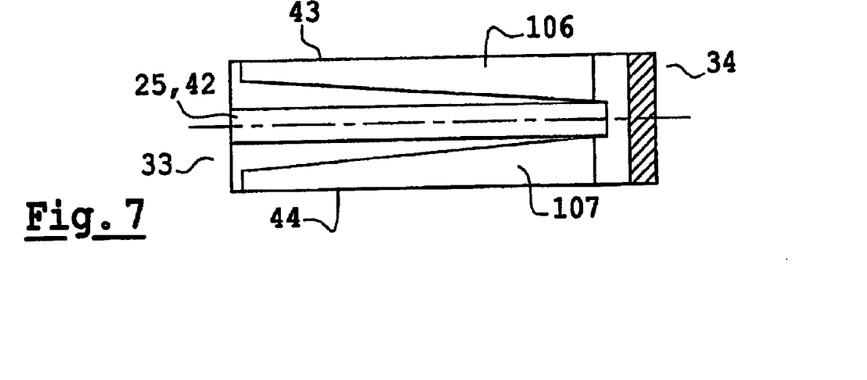
FIG. 7 is a diagrammatic representation of a variant according to the invention.

In another variant, the fins present on the insertion faces 43 and 44 may form a slicing blade 106 and 107 respectively, FIG. 7. Several blades may be present. For example, a blade may be placed at each corner formed by the faces 43 and 45, the faces 45 and 44, the faces 44 and 46, and the faces 46 and 43. These blades may be inserted along a longitudinal axis relative to the direction of insertion of the electric wire. Each of the blades widens from the front face 33 up to the rear face 34 in such a way that the protective sheath of the electric wire is sliced up to the electric wire proper, at a position of the blades that is close to the rear face 34, this position corresponding to a place where the blades are the most widened.

According to the invention, the housing is hollowed out with at least one space 47 partially going round the cylindrical compartment 4, FIG. 2. This space 47 is hollowed out on at least one part of the depth 8 of the housing. In one example, the housing 2 has three spaces 47, 48 and 49. These spaces are hollowed out throughout the depth 8 of the housing. The housing 2 has four sides 50, 51, 52 and 53, FIG. 2, with a width 9 and a depth 8. Each of the four sides has a plane perpendicular to the faces 33 and 34. Each of these sides may be provided with at least one precut passage 54. Three precut passages 54, 55 and 56 are shown in FIG. 2 on the sides 51, 52, 53 respectively. These precut passages have a circular shape but could be rectangular. These precut passages are made in such a way that they allow at least three electric wires to be taken in. These precut passages 54, 55 and 55 are laid out at a position of the housing 2 in such a way that they open out into the space 47, 48 and 49, FIG. 2.

In one example, the sides 50, 51, 52 and 53 may have a width 9 of 45 millimeters and a depth 8 of 41 millimeters. On the external periphery 7, the housing may also comprise uneven features in relief (not shown) in order to offer high adhesion to expansive foam or other binders, for the sealing of the housing into the wall. In one example, the sides may include slideways (not shown). These slideways are rails. Not only do these slideways enable the creation of rough features for improved adhesion to the wall but they also enable the combination of the housings with one another by simple sliding on the rails. By simple sliding, several electric enclosures according to the invention could therefore be horizontally or vertically aligned relative to a plane perpendicular to the plane of the wall during different combinations, without causing hindrance to a covering of the enclosures with a plate or decorative piece (not shown).

To insert a sleeve 3 designed to receive an electric connector or a sleeve comprising a switch mechanism, the cylindrical compartment 4 has an extension 57 used as a keying feature. This extension 57 is hollowed out from the central space 5 and is placed on the internal periphery 6 of the cylindrical compartment 4. Preferably, along a cross section of the housing, FIG. 3a, this extension 57 is a rectangular shape with a length 58 by 10 throughout a depth 8 of the housing. However, this extension 57 could have another shape. The length 58 is variable and depends on the type of enclosure chosen. In one example, the extension 57 will have a length 58 of 10 mm for the mounting of an enclosure designed to receive an electric connector. In another example, the extension 57 will have a length 58 of 12 mm for the installation of a switch.

The sleeve 3 has a shape slightly smaller than the shape of the compartment 4 and has the same depth 8. In the case of an electric enclosure designed to receive an electric connector, FIG. 1, the sleeve 3 has two holes 59 and 60 and an elongated protruding feature 61 corresponding to a ground. The three strips 30, 31 and 32 of the sleeve are positioned respectively on a wall of the hole 59, on a wall of the hole 60 and on the protruding feature 61 corresponding to the ground. Each of the holes 59 and 60 is designed to receive a plug of a detachable electric connector (not shown). The three strips 30, 31 and 32 of the sleeve 3 corresponding to the three main terminals are positioned in such a way that they are arranged so as to be facing the three plates 27, 28 and 29 corresponding to the three female terminals of the housing during the insertion of the sleeve 3 within the compartment 4 of the housing 2.

In order to be consolidated, the housing 2 has at least one reinforcement piece 62 joining two sides of the housing. In one example, FIG. 2, the housing has four reinforcement pieces 62, 63, 64 and 65.

The insertion of the sleeve 3 into the compartment 4 is achieved by elastic fitting or by clipping on. The term "elastic fitting" refers to the fact of inserting the sleeve 3 by sliding inside the compartment 4 and then holding this sleeve 3 fixedly within the compartment 4. This sleeve 3 can be held fixedly within the compartment 4 by fixing means. These fixing means may be small protruding features formed on a rim of the sleeve and designed to co-operate with a groove hollowed out correspondingly on the internal wall 6 of the housing.

It may be planned to fixedly embed the sleeve 3 by sliding it inside the compartment 4 in ensuring that the sleeve is fixedly embedded inside the compartment 4 for a pull strength of the sleeve that is greater than another pull strength of an electric connector. In one example, a pull strength of the sleeve according to the invention may be designed to be over 20 kg while a pull strength of an electric connector is usually designed to be about 5 kg. The fixing means could be made in such a way that they cooperate with one another at least up to a strength that withstands pulling forces of 20 kg. Thus, the strength with which an electric connector is removed from the electric enclosure according to the invention does not risk pulling the sleeve away from its housing.

A spring 66 FIG. 3b is laid out at the bottom 26 of the housing so as to favor the withdrawal of the sleeve during the dismantling of such an enclosure according to the invention.

Figure 6:
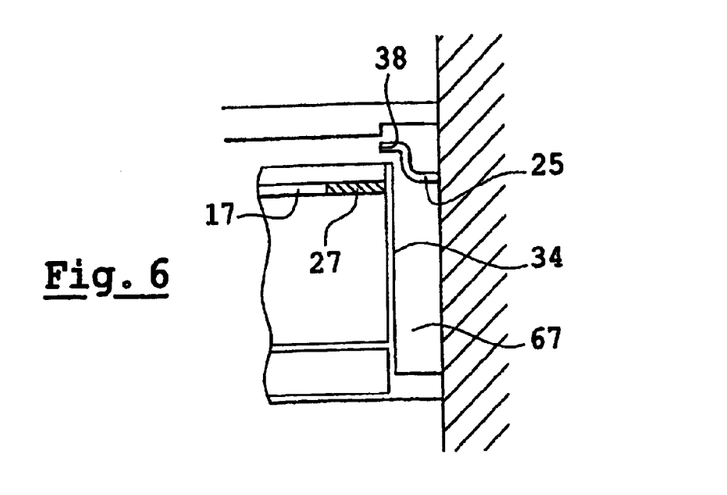
FIG. 6 is a diagrammatic representation of a variant of a face of an electric enclosure designed to be embedded in a wall according to the invention.

In one variant, FIG. 6, it may be that the face 34 is not flat. It may have a recess 67 hollowed out in it to facilitate the insertion of electric wires into the housing. Thus, the electric wires coming from the wall could get folded freely in the recess 67 so as to get accurately inserted into the housing.

The method of mounting an electric enclosure designed to receive an electric connector is carried out as follows. A hole is hollowed out into the wall by means of a bell saw. This hole is made in such a way that it allows the insertion of the embeddable electric enclosure according to the invention. The housing is first of all inserted into the hole of this wall. Electric wires coming from this hole are then placed in the recess 67 and inserted into the housing in passing by the holes 38, 39 and 40 present on the rear face 34. The electric wires could also penetrate through the front face 33 of the housing in passing by the precut passages 54, 55 and 56.

The electric wires 25 are slid by hand into the space of each connection space 22, 23 and 24. A simple push using the strength of a finger is sufficient to force the insertion of these wires into the connection spaces and flatten the fins 41. The force of the fingers and the presence of the fins in the connection spaces is enough to position the wire accurately before a plate 27, 28 and 29. The full insertion of the wire is ensured when the electric wire has shifted a flexible rod 68 fixed to one of the two internal faces 43 or 44 inside the connection spaces 22, 23 and 24 and placed in a position that is closest to the hole 38, 39 or 40 and/or a position that is closest to the hole 35, 36 and 37 following the insertion of the electric wire 25 by the rear face 34 or by the front face 33. In shifting, the flexible rod 68 has slid beneath a rigid rod 69 fixed on a face opposite to the preceding one 43 or 44. In one example, the flexible rod 68 is fixed to the face 43 and the rigid rod 69 is fixed to the face 44, FIGS. 5a and 5b. The sliding of the flexible rod 68 towards another side of the rigid rod 69 is perceived by a sound signal.

Then the wire is withdrawn slightly in the direction opposite to the direction of insertion of the wires so that the fins 41 can tend to get positioned perpendicularly relative to their site where they are fixed in order to slice the protective sheath. The slicing of the sheath means that the at least partially bared electric wire can be in direct contact with a plate 27, 28 or 29 or in indirect contact by means of fins.

Then the sleeve 3 is fixedly embedded by sliding within the compartment 4. It is fixed by elastic fitting or by being clipped on. The electric connection is set up by bringing the plates 27, 28 and 29 closer together or by bringing the connectors corresponding to the female terminals into direct contact with the electric wires with the strips 30, 31 and 32 corresponding to the main terminals designed to be in direct contact with the plugs of the electric connector.

The clipping on has the advantage of enabling the sleeve to be withdrawn with relative ease. The sleeve 3 can be withdrawn by being pulled by hand along a direction perpendicular and opposite to the wall. As mentioned here above, a pull strength of the sleeve relative to an enclosure intended to take an electric connector could be designed to be a strength greater than or equal to 20 kg.

To prevent the sleeve from being possibly pulled out in a direction opposite to the place in which the sleeve is inserted, the housing 1 can then be closed by a cover plate (not shown). This cover plate is made in such a way that it gets positioned in partially covering the sleeve and covering the rest of the housing. This cover plate covers the sleeve partially in such a way that the holes 59, 60 and protruding feature 61 are accessible to an electric connector. This overlapping plate is fixed by means of a male pin (not shown). The male pin is inserted into a cavity 70 by elastic fitting. To this end, the male pin cooperates with the cavity hollowed out in the housing in such a way that the male pin has a shape complementary to the shape of the cavity. The male pin can be inserted by hand into the cavity by embedding without any need for tools such as for example a screwdriver. As in the case of the sleeve 3 embedded inside the compartment 4, it may be planned to have a pull force for the cover plate greater than or equal to 20 kg. In one example, FIG. 1, the housing has four cavities 70, 71, 72 and 73 present at four corners of the housing 2.

The method for mounting an electric bridge to connect two electric enclosuress is performed as follows. A first enclosure is first of all mounted as described here above. After the insertion of the first wire coming from the rear face 34 or front face 33 of the housing in each of the connection spaces 22, 23 and 24, a second wire is inserted through the front face 33 of the housing in these same connection spaces. This other wire is positioned in the same way inside the connection space 22, 23 or 24 through the hole 35, 36 or 37 on the face 33. Inside these connection spaces, the wires then overlap in such a way as to be in contact. The electric wires that get inserted through the front face 33 of the housing are then led toward the exterior of the housing. The wires come out of the end through the holes 35, 36, or 37 and then pass through grooves 74 and 75 designed for this purpose, FIG. 2. The grooves have a size wide enough to allow three electric wires to slide therein. These grooves are hollowed out in the tie-bars 20 and 21, close to the front face 33 of the housing at the place in which the connection spaces are located 22, 23, 24, between the external periphery 7 of the housing and the partition wall 17, 18 and 19.

Then each wire comes out of the housing through the precut passage 54, 55 and 56. Each of the wires or all the wires together can be joined so as to pass through a single precut passage. In one example, FIG. 1, the electric wires can come out by the passages 54, 55 and 56 located on the sides 51, 52 and 53 respectively. The wires coming out of the first enclosure can then meet a second enclosure and get inserted in each connection space designed for this purpose on either one of the faces 33 and 34.

For the installation of an electric enclosure on the switch, electric wires are installed inside the housing 2 as described here above. Then the sleeve 3 is inserted inside the cylindrical compartment 4. In this precise case, this sleeve has the switch mechanism setting up contact between the wires upon command applied through pressure on a handle.

Thus, to adapt a given electric connector to a universal electric enclosure, it will then be enough to dismantle the enclosure. The dismantling of such an electric enclosure will consist in removing the cover plate from the housing and removing the sleeve from the cylindrical compartment of the housing, by pulling it along an axis perpendicular to the playing of the wall, in order to insert therein another sleeve, corresponding to a desired electric connector, by elastic fitting.

Figure 8:
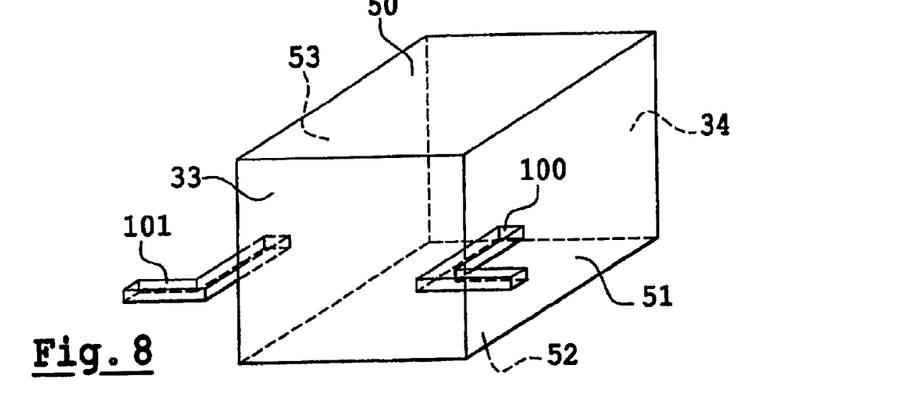
FIG. 8 is a diagrammatic representation of a housing provided with means of guidance according to the invention.

The electric enclosure may comprise guidance means 100, 101, FIG. 8. The guidance means 100, 101 may be designed to orient the electric enclosure relative to a plane formed by the ground. Preferably, these guidance means enable the housing to be oriented with two opposite sides of the housing, each forming a plane perpendicular to the plane formed by the ground. These guidance means are located on the housing and are made in such a way that they can be broken after fixing to the plaster of the housing in the hole. These guidance means enable the housing to be oriented when the plaster used to fix the housing in the hole is not yet dry. When the plaster is dry and the enclosure is positioned in a desired location relative to the plane formed by the ground, it is then enough to break these guidance means with a hammer or screwdriver.

These guidance means may be a first guidance arm 100 and a second guidance arm 101, FIG. 8. These guidance arms may be fixed to a first side and to a second side of the housing. Preferably, these guidance arms 100 and 101 are fixed on two opposite sides. In the example shown in FIG. 8, the first guidance arm 100 and the second guidance arm 101 are fixed respectively to the side 51 and to the side 53 of the housing 2. These guidance arms form right angles by which they can rest on and get secured against the wall near the hole hollowed out in the wall. The guidance arms are preferably fixed to a central part of the housing and extend from the side corresponding to the housing in a direction opposite that of the housing and along a direction perpendicular to a plane formed by the side 51 and the side 53. These arms are fixed to a side of the housing while extending and going over the front face 33 in such a way that the front face 33 forms a plane surface in continuity with a plane formed by the wall once the enclosure is placed in the hole. A level gauge can then be positioned along an axis on which the two guidance arms are positioned to adjust the orientation of the enclosure along the axis on which are located the two arms parallel to the plane formed by the ground.

Figure 9:
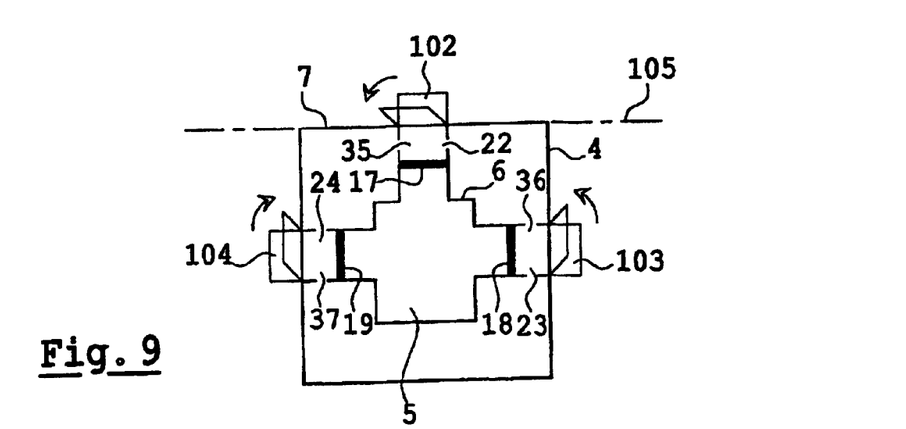
FIG. 9 is a diagrammatic representation of a housing provided with protection tabs.

To protect the electric wires, tiltable protection tabs 102, 103 and 104 may also be placed on the housing 2 in order to block the holes 35, 36 and 37 respectively of the connection spaces 22, 23 and 24 once the electric wires are inserted therein, FIG. 9. These tabs are fixed to the front face 33 of the housing in the vicinity of the holes 35, 36 and 37. In the example of FIG. 9, the tabs are fixed to the outer ring 7 of the housing. However the tabs could be placed on the inner rim 6 or on one of the tie-bars 20, 21. These tabs are designed to fold down (as represented by an arrow in FIG. 9) while tilting about an axis 105, said axis 105 being formed along a ridge of the housing.

The invention claimed is:

1. An electric contact enclosure comprising:
    a housing provided with a hollow compartment, the housing being embeddable in a hole in a wall,
    a contact sleeve designed to receive plugs of a detachable electric connector, wherein the contact sleeve is slidably embedded inside the compartment of the housing, and wherein the compartment is correspondingly complementarily shaped to accommodate receipt of the contact sleeve,
    wherein the contact sleeve comprises three contact strips and the housing comprises three electrically conductive plates each in direct contact with a corresponding one of a plurality of electrical wires extending into the housing and each in direct contact with a corresponding one of the three conductive plates; and
    wherein the compartment comprises three communicating cavities each provided with a partition demarcating a connection space designed to each receive one end of a corresponding one of the electrical wires, separated by a main space designed to receive the contact sleeve, and wherein the contact sleeve comprises, correspondingly with the partitions, three protruding features, and wherein a part of each partition is formed by a corresponding electrically conductive plate.

2. The electric enclosure according to claim 1, wherein the compartment comprises an extension serving as a keying feature at an internal periphery of the periphery thereof, the extension comprising a rectangular shape with a length of about 11 millimeters extending throughout a depth of the housing, along a cross-section of the housing.

3. The electric enclosure according to claim 1, wherein in the connection spaces, the housing comprises holes on a front face and holes on a rear face of the housing, the holes configured to accept the passage of a single electric wire and preferably being such that electric wires inserted through these holes are parallel to each other inside the connection spaces.

4. The electric enclosure according to claim 1, wherein the connection spaces are provided with fins inserted into two opposite internal faces, the fins being tiltable and tilted relative to a direction of insertion of an electric wire.

5. The electric enclosure according to claim 1, wherein the housing is hollowed out with at least one space partially extending around the compartment, each space being preferably provided with at least one precut passage.

6. The electric enclosure according to claim 1, wherein the housing comprises tie-bars between the partitions and the housing, the tie-bars comprising grooves, having sizes that are preferably large enough to allow three electric wires to slide inside them, and being located close to a front face of the housing.

7. The electric enclosure according to claim 1, wherein the contact sleeve and housing are configured to permit removal of the sleeve from the housing and further comprising a switch sleeve comprised of a switch and having three protruding features each having a contact strip that is receivable in the housing compartment in the housing with each protruding feature of the sleeve received in a corresponding one of the communicating cavities and each contact strip electrically connecting with a corresponding one of the electrically conductive plates of the housing when the switch sleeve is inserted into the housing compartment.

8. The electric enclosure according to claim 1, further comprising a means of guidance and orientation relative to a plane formed by the ground.

9. The electric enclosure according to claim 1, further comprising tiltable protection tabs about an axis formed along an edge of the housing, each of the tabs being designed to plug a hole of a front face of the housing, and wherein at least one electric wire being intended to be inserted through this hole.

10. The electric enclosure according to claim 1, wherein the compartment is centered inside the housing.

11. The electric enclosure according to claim 10, wherein the compartment is T-shaped.

12. A method of mounting an electric enclosure, comprising:
providing a wall-fixable housing having three spaced apart electrical wire connection spaces disposed therein and each in communication with an electrical conductor disposed therealong with each wire connection space with a corresponding opening in a rear face of the housing with the wire connection spaces located alongside a compartment configured to receive an electrical plug-accepting sleeve carrying a plurality of spaced apart electrical contacts each configured for making an electrical connection with an electrical of an electrical plug;
inserting the housing into a wall,
sliding each one of three wires coming from the wall into a corresponding one of the three wire connection spaces in the housing through corresponding openings in the rear face of the housing,
sliding the sleeve into the interior of the housing such that each electrical contact of the sleeve makes an electrical connection with one of the electrical conductors of the housing, thereby forming an electrical connection, and
fixing a covering plate onto the housing.

13. The method of mounting according to claim 12, further comprising:
inserting three other wires into each of the connection spaces through holes on a front face of the housing, and
moving the wires out of the housing through precut passages in the housing.

14. The method of claim 12, wherein the compartment comprises an extension serving as a keying feature at an internal periphery, the extension along a cross-section of the housing and the extension comprising a rectangular shape with a length of between 10–12 millimeters along a cross-section of the housing.

15. The method of claim 12, wherein the compartment comprises three communicating cavities each provided with a partition demarcating a connection space designed to receive ends of electrical wires, separated by a main space designed to receive the sleeve, the sleeve comprising, correspondingly with these partitions, three protruding features.

16. A method of the mounting the electric enclosure according to claim 12, wherein the sleeve and housing are configured to permit removal of the sleeve from the housing and the method steps further comprising providing a switch sleeve carrying a plurality of spaced apart electrical contacts, removing the plug-accepting sleeve from the housing, and thereafter sliding the switch sleeve into the housing compartment.

17. An electric contact enclosure comprising:
a housing comprising a hollow cylindrical compartment, the housing being embeddable in a wall,
a contact sleeve designed to form a switch, wherein the contact sleeve is cylindrical and is embedded by sliding inside the compartment of the housing,
wherein the contact sleeve comprises three contact strips and the housing comprises three electrically conductive plates in direct contact with electrical wires into the housing and the three contact strips; and
the cylindrical compartment comprises three communicating cylindrical cavities each provided with a partition demarcating a connection space designed to receive ends of electrical wires, separated by a main space designed to receive the contact sleeve, and the contact sleeve comprises, correspondingly with the partitions, three cylindrical protruding features, and a part of each partition is formed by the correspondingly electrically conductive plate.

18. The electric contact enclosure of claim 17, wherein the housing comprises protection stubs tiltable about an axis formed along an edge of the housing, each of the stubs being designed to plug a hole in a front face of the housing and at least one electric wire being intended to be inserted through the hole.

19. The electric enclosure of claim 17, wherein the cylindrical compartment is centered inside the housing.

20. The electric enclosure of claim 17, wherein the cylindrical compartment is T-shaped.

21. The electric enclosure of claim 17, wherein the cylindrical compartment comprises an extension at an internal periphery of the cylindrical periphery, the extension preferably possessing, along a cross-section of the housing, a rectangular shape with a length of between 10 and 12 millimeters extending throughout a depth of the housing.

22. The electric enclosure according to claim 17, wherein the housing comprises holes in a front face and in a rear face of the housing that communicate with a corresponding one the connection spaces with the holes configured to each accept passage of a portion of at least one electric wire such that electric wires inserted into the holes extend parallel to each other inside the connection spaces.

23. The electric enclosure according to claim 17, wherein the housing is hollowed out with at least one space partially extending around the cylindrical compartment and with at least one precut passage.

24. The electric enclosure according to claim 17, further comprising tie-bars disposed between the partitions and the housing with the tie-bars comprising grooves disposed adjacent a front of the housing that are large enough to allow insertion of three electric wires.

25. The electric enclosure according to claim 17, further comprising connection fins disposed in each connection space that extend outwardly from two opposite internal faces with the fins tiltable toward an incoming electric wire being inserted therein.

26. The method according to claim 25 wherein one of the sleeves inserted into the housing during step (d) is removed and the other one of the sleeves is thereafter inserted into the housing.

27. A method of mounting an electric enclosure comprising:
(a) providing a wall-embeddable housing comprised of three electrically conductive plates each disposed in a wire connection bore formed in the housing located adjacent a hollow compartment formed in the housing that includes three slots, an electrical connector sleeve receivable in the housing compartment and having three flanges that are each receivable in one of the slots of the housing compartment, and a switch sleeve receivable in the housing compartment and having three flanges that are each receivable in one of the slots of the housing compartment;

(b) inserting the housing into a wall;

(c) inserting an insulated electrical wire into each one of the wire connection bores in the housing with insertion causing the electrical wire to make electrical connection with an adjacent one of the electrically conductive plates in the housing;

(d) inserting one of the sleeves into the housing compartment with each electrical contact of the sleeve forming an electrical connection with one of the electrically conductive plates in the housing along a longitudinally extending region of overlap between therebetween; and (e) attaching an exteriorly located covering plate to the housing.

28. An electric contact enclosure comprising:

(a) a wall-embeddable housing that includes an elongate longitudinally extending compartment formed therein having three outwardly extending channels imparting a generally T-shaped cross section thereto and an elongate electric power wire-receiving bore formed therein extending alongside each one of the compartment channels with the housing and that comprises an electrical conductor disposed in each wire-receiving bore electrically contacting an exposed electrically conductive portion of an electric power wire received in the wire receiving bore;

(b) a sleeve insert having a plurality of electrical connector plug receiving bores formed therein and three outwardly extending flanges imparting a generally T-shaped cross section thereto and comprising an electrical contact carried by each flange and in electrical communication with an electrical connector plug received in a corresponding one of the electrical connector plug receiving bores; and (c) wherein the sleeve insert is removably receivable in the compartment in the housing with each one of the electrical contacts of the sleeve insert overlapping and electrically contacting a corresponding one of the electrical conductors of the housing when the sleeve insert is removably received in the compartment in the housing.

29. An electric contact enclosure comprising:

(a) a wall-embeddable housing that includes an elongate longitudinally extending compartment formed therein having three outwardly extending channels imparting a generally T-shaped cross section thereto and an elongate electric power wire-receiving bore formed therein extending alongside each one of the compartment channels with the housing including a plurality of spaced apart wire insulation engaging fins extending outwardly into each one of the wire-receiving bores and that comprises an electrical conductor disposed in each wire-receiving bore electrically contacting an exposed electrically conductive portion of an insulated electric power wire inserted into the wire receiving bore;

(b) a sleeve insert having a plurality of electrical connector plug receiving bores formed therein and three outwardly extending flanges imparting a generally T-shaped cross section thereto and comprising an electrical contact carried by each flange and in electrical communication with an electrical connector plug received in a corresponding one of the electrical connector plug receiving bores;

(c) wherein the sleeve insert is removably receivable in the compartment in the housing with each one of the electrical contacts of the sleeve insert electrically contacting a corresponding one of the electrical conductors of the housing when the sleeve insert is removably received in the compartment in the housing; and (d) wherein wire insulation engaging fins in a corresponding wire-receiving bore engage insulation of an insulated electric power wire during its insertion into the corresponding wire-receiving bore causing exposure of an electrically conductive portion of the wire that thereby contacts the electrical conductor associated with the corresponding wire-receiving bore.

* * * * *